United States Patent
Hedhli et al.

(10) Patent No.: US 8,557,938 B2
(45) Date of Patent: Oct. 15, 2013

(54) BRANCHED FLUOROPOLYMERS

(75) Inventors: Lotfi Hedhli, King of Prussia, PA (US); Nafih Mekhilef, King of Prussia, PA (US)

(73) Assignee: Arkema Inc., King of Prussia, PA (US)

(*) Notice: Subject to any disclaimer, the term of this patent is extended or adjusted under 35 U.S.C. 154(b) by 477 days.

(21) Appl. No.: 11/271,057

(22) Filed: Nov. 10, 2005

(65) Prior Publication Data
US 2007/0106010 A1 May 10, 2007

(51) Int. Cl.
*C08F 4/38* (2006.01)

(52) U.S. Cl.
USPC ........... 526/228; 524/805; 526/227; 526/229; 526/255

(58) Field of Classification Search
USPC ............ 524/543, 544, 805; 526/89, 225, 227, 526/255, 228, 229
See application file for complete search history.

(56) References Cited

U.S. PATENT DOCUMENTS

| | | | |
|---|---|---|---|
| 3,249,595 A | 5/1966 | Lederer et al. | |
| 4,144,227 A * | 3/1979 | Giuffre et al. | 525/353 |
| 4,276,214 A * | 6/1981 | Yoshimura et al. | 524/546 |
| 4,335,238 A * | 6/1982 | Moore et al. | 526/254 |
| 4,342,675 A * | 8/1982 | Gangal | 524/762 |
| 4,380,618 A * | 4/1983 | Khan et al. | 526/206 |
| 5,093,409 A * | 3/1992 | Buckmaster | 524/544 |
| 5,585,449 A | 12/1996 | Arcella et al. | |
| 5,612,419 A | 3/1997 | Arcella et al. | |
| 6,300,451 B1 | 10/2001 | Mehta et al. | |
| 6,492,470 B2 * | 12/2002 | Crump et al. | 526/75 |
| 6,703,464 B2 * | 3/2004 | Kono et al. | 526/247 |
| 6,743,876 B2 | 6/2004 | Wille et al. | |
| 6,774,164 B2 | 8/2004 | Lyons et al. | |
| 6,869,997 B2 | 3/2005 | Wille et al. | |
| 6,927,265 B2 | 8/2005 | Kaspar et al. | |
| 7,122,610 B2 | 10/2006 | Wille et al. | |
| 2003/0149228 A1 | 8/2003 | Loontjens et al. | |
| 2004/0192868 A1* | 9/2004 | Kaspar et al. | 526/249 |
| 2004/0260022 A1 | 12/2004 | Amos et al. | |
| 2009/0221776 A1 | 9/2009 | Durali et al. | |

OTHER PUBLICATIONS

Logothetis, A. L. "Chemistry of Fluorocarbon Elastomers," Prog. Polym. Sci., 1989, Pergamon Press, vol. 14, 251-296.*
"Molecular Weight Distribution of Fluorinated Polymers with Long Chain Branching", Macromolecules 2000, 33, 1656-1663, Patrizia Maccone and Marco Apostolo, Giuseppe Ajroldi, Pub. on Web Feb. 16, 2000.
"Long-Chain Branched Polypropylenes by Electron Beam Irradiation and Their Rheological Properties", Macromolecules 2004, 37, 9465-9472, Dietmar Auld, Jens Stange, and Helmut Munstedt; Beate Krause, Dieter Voigt, Albena Lederer, Uwe Lappan, and Klaus Lunkwitz, Pub. on Web Nov. 11, 2004.
"Synthesis of Long-Chain Branched Comp-Structured Polyethylene from Ethylene by Tandem Action of Two Single-Site Catalysts", Macromolecules 2003, 36, 9014-9019, O. Sperber and W. Kaminsky, Pub. on Web Oct. 31, 2003.
"Synthesis of Long-Chain Branched Propylene Polymers via Macromonomer Incorporation", Macromol, Rapid Commun, 2001, 22, 1488-1492, Welqing Weng, Eric Markel, Armenag Dekmezian, Rec. Jul. 3, 2001.
"Microemulsion Polymerization for Producing Fluorinated Structured Materials", Macromol, Symp. 2004, 206, 347-360, Marco Apostolo, Giovanni Biressi, 2004.
"Long Chain Branched Polypropylene via Macromer Incorporation", Weiqing Weng, Eric Markel, Armenag Dekmezian, Polymer Preprints 2000, 41(2), 1924-1925.
"A New Multifunctional Peroxide Initiator for High Molecular Weight, High Productivity, and Long-Chain Branching", Society of Plastics Engineering, 2002 Proceedings, Leo Kasehagen, Jerome Wicher, Joseph Brennan, Fabien Debaud, Tomoyuki Suehisa, 5 pages.
"Synthesis and Morphology of Branched Polyethylene-Like Polyesters Derived fromLong-Chain Aliphatic Diols", Polymer Preprints (ACS Polymer Chemistry) (2002), 43(2) 472-473, M. Gabriele Menges, Klaus Schmidt-Rohr, Jacques Pennelle.
"Evolution of Molecular Weight and Long Chain Branch Distributions in Olefin-Diene Copolymerization", Macromol, Theory Simul, 2003, 12, 582-592, Marcia Nele, Joao Soares, Jose Pinto, Accepted Jul. 31, 2003.

* cited by examiner

*Primary Examiner* — Nicole M Buie-Hatcher
(74) *Attorney, Agent, or Firm* — Thomas F. Roland

(57) ABSTRACT

The invention relates to the preparation of branched fluoropolymers having long chain branches and little or no gels, by a process involving polymerization at high temperatures using persulfates and optionally multifunctional initiators. The invention also relates to gel-free, branched polymers with strain hardening produced by the process.

4 Claims, 5 Drawing Sheets

Rotational Rheometry Data: Viscosity crossover showing enhanced shear thinning

Rotational Rheometry: Showing enhanced Storage modulus at low frequencies

Melt strength measurements: Force as a function of Draw down ratio

Extensional Viscosity: Measurement of extent of strain hardening

BRANCHED FLUOROPOLYMERS

FIELD OF THE INVENTION

The invention relates to the preparation of branched fluoropolymers having long chain branches and little or no gels, by a process involving polymerization at high temperatures using persulfates and optionally co-initiators. The invention also relates to gel-free, branched polymers with strain hardening produced by the process.

BACKGROUND OF THE INVENTION

Flouropolymers are melt-processable resins that are formed into polymer structures by many different processes, such as extrusion, injection molding, fiber spinning, extrusion blow molding and blown film. They are also used as polymer processing aids due to their low surface energies and phase behaviors.

The performance of polymeric resins during processing, especially their ease of processing, stability, and reliability, is essentially dominated by their viscoelastic properties. In particular, the polymer should exhibit strain hardening, shear thinning behavior, and a good balance between melt-strength and drawdown ratio. In addition, the polymer must retain good solid-state properties.

Fluoropolymers, typically made by an emulsion process, show moderate shear thinning behavior, and display poor melt strength for low molecular weight resins. They are generally linear and do not exhibit strain hardening upon an elongational deformation at small rates. As such, they are not very useful in applications such as blown films, extrusion blow molding, thermoforming and rigid foams.

Increasing the fluoropolymer molecular weight increases the melt strength, but often decreases the drawdown ratio. It is therefore difficult to obtain a balance between the parameters of melt strength and drawdown ratio without chemically changing the structure of the polymer. Crosslinked polymers may increase the melt strength, but are limited by the fact that they are not easily processable and often contain a high amount of gels.

One approach to achieve such a balance of properties is to introduce long chain branches onto the main backbone of the polymer. This allows for a wide range of architectures and hence wide ranges of melt rheological properties. There are various known ways to introduce long chain branching (LCB) onto the polymer backbone.

In olefin polymerization, catalysts are used to create controlled long chain branched polyethylene by copolymerization of ethylene with higher alpha-olefins, as described in WO 9612744 and Macromolecules (2003), 36(24), 9014-9019.

For polycondensation polymers, functional monomers are used to create LCB, as described in WO 2001066617 or branched diacid chains as described in Polymer Preprints (ACS Polymer Chemistry) (2002), 43(2), 472-473.

It has been shown that a gel-free highly branched polymer is difficult to achieve via emulsion polymerization. Journal of Polymer Science, Part A: Polymer Chemistry (1997), 35(5), 827-858.

Long chain branching has been achieved in polystyrene through the use of multifunctional initiators such as Luperox JWEB (Kasehagen et al., Society of Plastics Engineering, 2002 proceedings).

Fluoromonomers are very sensitive to hydrogen abstraction and conventional approaches to branching in other monomer systems, such as described above, cannot necessarily be used.

Several methods have been used to improve the long chain branching in flouropolymers. Macromolecular Symposia (2004), 206 (Polymer Reaction Engineering V), 347-360, discloses the use of reversible chain transfer based on iodine for the formation of long branches in a polymer. Branching can be induced by using bifunctional molecules that are able to link two different polymer chains to each other during polymerization. This is a 2 step process where the telomers have to be prepared separately. The present invention achieves the desired results without the use of such telomers.

Macromolecules (2000), 33(5), 1656-1663 discloses fluoropolymers in which trifunctional long-chain branches are originated by the transfer-to-polymer mechanism. In the present invention branching is achieved without the use of fluorinated diolefins.

U.S. Pat. No. 5,612,419 and U.S. Pat. No. 5,585,449 disclose a 2-step process using a bis-olefin to prepare fluorinated thermoplastic elastomers.

Branching through the use of low levels of radiation is disclosed in U.S. patent application Ser. No. 11/157,225

There is a need for a branched fluoropolymer that exhibits a low onset of shear thinning, and a good balance between melt-strength and drawdown ratio, while retaining good solid-state properties.

Surprisingly it has been found that fluoropolymers having long chain branching with the properties listed above can be achieved through the use of a certain persulfate initiators at very high temperatures. The branching can be optimized by using a co-initiator. One added advantage of this method is that the branched fluoropolymers contain little or no gels. These new materials would find application in areas where good melt rheology properties are required, such as blown films, fiber spinning, extrusion blow molding, thermoforming and rigid foams.

SUMMARY OF THE INVENTION

The invention relates to a process for forming a branched fluoropolymer comprising:
a) combining at one or more fluoromonomers, a persulfate initiator, and a liquid carrier to form a reaction mixture;
b) heating the reaction mixture to a temperature of greater than 100° C.; and
c) delaying a constant feed of persulfate initiator to the reaction mixture during the course of the polymerization,
to produce a branched fluoropolymer having long chain branches, and less than 5 percent by weight of gels.

The invention further relates to a branched fluoropolymer having:
a) branching equal to or greater than the critical molecular weight between entanglements;
b) strain hardening;
c) a radius of gyration ratio of less than 1, wherein the radius of gyration ratio is determined by the radius of gyration of the branched fluoropolymer, divided by the radius of gyration of a linear fluoropolymer of the same chemical composition and molecular weight;
d) less than 5% by weight of gels; and
a weight average molecular weight of from 20,000 to 2,000,000 g/mol.

DETAILED DESCRIPTION OF THE INVENTION

Figure 1:
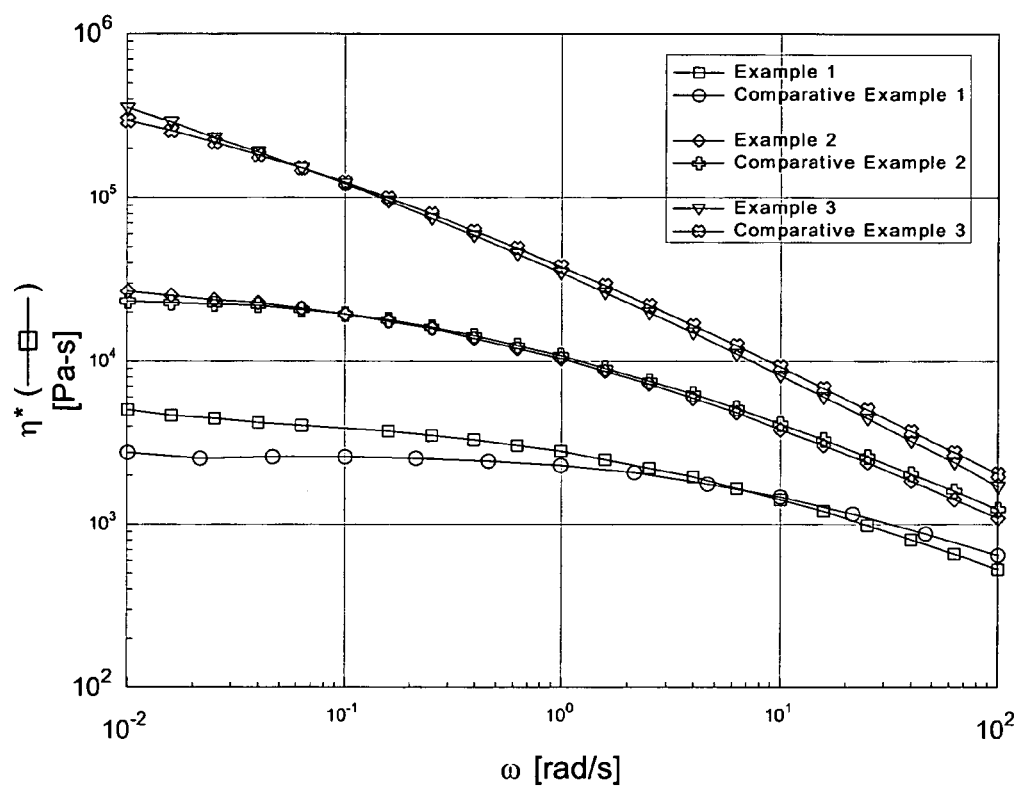
FIG. 1: Shows the complex viscosity versus frequency as measured by an oscillatory rheometer at 230° C. for the branched polymers of the invention and comparative linear polymers.

The term "draw down ratio", as used herein refers to the ratio of the amount a polymer can be stretched in the molten state to the rate at which it is extruded.

The term "shear thinning", as used herein, refers to a drop in viscosity with shear rate. Branched polymers are known to exhibit a lower onset of shear thinning than linear polymers. In some cases the slope of the viscosity shear rate curve can be steeper than in linear polymers.

This invention relates to the preparation of branched fluoropolymers having long chain branches and little or no gels, by a process involving polymerization at high temperatures using persulfates and optionally multifunctional co-initiators.

The present invention makes use of persulfate initiators at high polymerization temperatures for producing branched fluoropolymers. Examples of persulfate initiators useful in the invention include, but are not limited to, sodium, potassium and ammonium persulfate salts. Potassium persulfate has been used as an initiator for fluoromonomers, and is generally known not to cause branching in the resulting flouropolymers. When potassium persulfate is used for the polymerization of vinylidene fluoride at 80° C., branching does not occur. Surprisingly it was found that when potassium persulfate was used as the flouromonomer initiator at 120° C., significant long chain branching was found in the resulting fluoropolymer.

The amount of persulfate salt added to the reaction mixture (based upon the total weight of monomer added to the reaction mixture) is from about 0.01 to 1.0 weight percent, preferably 0.01 to 0.4 percent. Since the half life of the persulfate initiator at the elevated temperature is short, the process of the invention involves a continuous addition of initiator to the reactor.

While branching is achievable using the persulfate initiator as the sole initiator, it can be beneficial to use one or more co-initiators. The use of co-initiators provides added control to the amount and type of branching that occurs in the fluoropolymer. In one embodiment, the co-initiator is di-functional, though mono-functional and multi-functional co-initiators are also contemplated in the invention. Examples of initiators useful as co-initiators in the present invention include, but are not limited to, diperoxide initiators such as di-t-amyl peroxide and n-butyl 4,4 bis(t-butyl peroxy) valerate. The co-initiator(s) is used at a level of from 0-1%, preferably 0.01 to 0.3%, based on total monomer.

The term "fluoromonomer" or the expression "fluorinated monomer" means a polymerizable alkene which contains at least one fluorine atom, fluoroalkyl group, or fluoroalkoxy group attached to the double bond of the alkene that undergoes polymerization. The term "fluoropolymer" means a polymer formed by the polymerization of at least one fluoromonomer, and it is inclusive of homopolymers, copolymers, terpolymers and higher polymers which are thermoplastic in their nature, meaning they are capable of being formed into useful pieces by flowing upon the application of heat, such as is done in molding and extrusion processes. The thermoplastic polymers typically exhibit a crystalline melting point.

The thermoplastic polymers useful in the invention are the homopolymer made by polymerizing vinylidene fluoride (VDF), and copolymers, terpolymers and higher polymers of vinylidene fluoride wherein the vinylidene fluoride units comprise greater than 70 percent of the total weight of all the monomer units in the polymer, and more preferably, comprise greater than 75 percent of the total weight of the units. Copolymers, terpolymers and higher polymers of vinylidene fluoride may be made by reacting vinylidene fluoride with one or more monomers from the group consisting of vinyl fluoride, trifluoroethene, tetrafluoroethene, one or more of partly or fully fluorinated alpha-olefins such as 3,3,3-trifluoro-1-propene, 1,2,3,3,3-pentafluoropropene, 3,3,3,4,4-pentafluoro-1-butene, and hexafluoropropene, the partly fluorinated olefin hexafluoroisobutylene, perfluorinated vinyl ethers, such as perfluoromethyl vinyl ether, perfluoroethyl vinyl ether, perfluoro-n-propyl vinyl ether, and perfluoro-2-propoxypropyl vinyl ether, fluorinated dioxoles, such as perfluoro(1,3-dioxole) and perfluoro(2,2-dimethyl-1,3-dioxole), allylic, partly fluorinated allylic, or fluorinated allylic monomers, such as 2-hydroxyethyl allyl ether or 3-allyloxypropanediol, and ethene or propene. Preferred copolymers or terpolymers are formed with vinyl fluoride, trifluoroethene, tetrafluoroethene (TFE), and hexafluoropropene (HFP).

Especially preferred copolymers are of VDF comprising from about 71 to about 99 weight percent VDF, and correspondingly from about 1 to about 29 percent TFE; from about 71 to 99 weight percent VDF, and correspondingly from about 1 to 29 percent HFP (such as disclosed in U.S. Pat. No. 3,178,399); and from about 71 to 99 weight percent VDF, and correspondingly from about 1 to 29 weight percent trifluoroethylene.

Especially preferred thermoplastic terpolymers are the terpolymer of VDF, HFP and TFE, and the terpolymer of VDF, trifluoroethene, and TFE, The especially preferred terpolymers have at least 71 weight percent VDF, and the other comonomers may be present in varying portions, but together they comprise up to 29 weight percent of the terpolymer.

In addition to the fluoromonomers and initiators, other typical adjutants and process aids may be added to the reaction mixture, including but not limited to surfactants and emulsifiers, cosurfactants, chain transfer agents, buffering agents, and antifoulants. They may added to a polymerization in a single portion at the beginning of the reaction, or incrementally or continuously throughout the reaction.

The surfactants and emulsifiers are typically used in an amount from about 0.02 to about 1.0 weight percent on total monomer. Preferably they are used in an amount from about 0.05 to about 0.5 weight percent on total monomer. The surfactants may be used in solution such as in aqueous solution for convenient handling. Surfactants useful in the present invention include fluorosurfactants, 3-allyloxy-2-hydroxy-1-propane sulfonic acid salt, polyvinylphosphonic acid, polyacrylic acids, polyvinyl sulfonic acid, and salts thereof polyethylene glycol and/or polypropylene glycol, alkyl phosphonates.

Chain-transfer agents are added to the polymerization to regulate the molecular weight of the product. The amount and mode of addition of chain-transfer agent depend on the activity of the particular chain-transfer agent employed, and on the desired molecular weight of the polymer product. The amount of chain-transfer agent added to the polymerization reaction is preferably from about 0.05 to about 5 weight percent, more preferably from about 0.1 to about 2 weight percent based on the total weight of monomer added to the reaction mixture. Examples of chain transfer agents useful in the present invention include: oxygenated compounds such as alcohols, carbonates, ketones, esters, and ethers may serve as chain-transfer agents. Ethane, propane, and halocarbons and hydrohalocarbons, such as chlorocarbons, hydrochlorocarbons, chlorofluorocarbons and hydrochlorofluorocarbons may also be used as chain transfer agents.

The polymerization reaction mixture may optionally contain a buffering agent to maintain a controlled pH throughout the polymerization reaction. The pH is preferably controlled within the range of from about 4 to about 8, to minimize undesirable color development in the product.

The addition of a paraffin wax or hydrocarbon oil to the reaction serves as an antifoulant to minimize or prevent polymer adhesions to the reactor components. Any long chain saturated hydrocarbon wax or oil can perform this function. The amount of oil or wax added to the reactor is an amount, which serves to minimize the formation of polymer adhesions to the reactor components. The amount is generally proportional to the interior surface area of the reactor and may vary from about 1 to about 40 mg per square centimeter of reactor interior surface area. The amount of paraffin wax or hydrocarbon oil is preferably about 5 mg/cm² of the reactor interior surface area.

The polymerization process of the invention is performed in a liquid carrier medium, in either an aqueous medium (emulsion or suspension polymerization), or in supercritical carbon dioxide. A preferred process is by emulsion polymerization.

A key to produce long chain branching is to run the reaction at a high temperature of greater than 100° C., preferably greater than 110° C., and most preferably at from 120-150° C. The persulfate initiator has a short half-life at these elevated temperatures, and must be added continuously over the life of the polymerization. Monomer, comonomer and other adjuvants used in the reaction may be added to the initial charge, or may be partially added to the initial charge, with the remainder fed to the reactor on a delayed basis.

The pressure used for polymerization may vary from 280-20,000 kPa, depending on the capabilities of the reaction equipment, the initiator system chosen, and the monomer selection. The polymerization pressure is preferably from 2,000-11,000 kPa, and most preferably from 2,750-7000 kPa.

The fluoropolymer produced by the method of the invention is a gel-free polymer having long chain branching. By "gel-free" as used herein is meant that the fluoropolymer contains less than 5 weight percent gels, preferably less than 2 weight percent gels, and most preferably less than 1 weight percent gels, based on the total weight of polymer. By gel is meant the fraction of polymer that is not soluble under standard solubilization conditions in conventional fluoropolymer solvents such as acetone, THF, or DMSO.

The amount of branching and the molecular weight of the fluoropolymer can be controlled by adjusting the temperature, initiator feed rate, and amount of co-initiator. "Long chain" branching, as used herein means that the average branch is larger than the critical molecular weight between entanglements. For a polyvinylidene fluoride polymer, this would be about 2,500 g/mole. In addition to long chain branching, it is anticipated that short chain branching will also be present. The weight average molecular weight of the fluoropolymer is in the range of 20,000 to 2,000,000 g/mol. An average molecular weight in the range of 100,000 to 600,000 is preferred for a melt processable application, while lower molecular weight branched flouropolymers may be used as process aids.

The product of the polymerization by emulsion polymerization is a latex, which can be used in that form, usually after filtration of solid byproducts from the polymerization process, or which can be coagulated to isolate the solids, which may then be washed and dried. For use in the latex form, the latex can be stabilized by the further addition of further surfactant, which may be the same or a different ionic surfactant, or may be of a different type, such as an non-ionic surfactant. For solid product, the latex may be coagulated mechanically or by the addition of salts or acids, and then isolated by well-known means such as by filtration. Once isolated, solid product can be purified by washing or other techniques, and it may be dried for use as a powder, which can be further processed into granules. Solid product can also be combined with solvent and used as a solvent dispersion or solution.

The branched fluoropolymer produced by the process of the invention has enhanced rheological properties compared to linear flouropolymers. These properties are characterized by a viscosity profile showing a lower onset of shear thinning, a lower power-law index "n", a higher melt strength for an equivalent molecular weight and a higher drawdown ratio. In addition, the solid-state properties such as modulus and tensile strength remain similar to conventional fluoropolymers containing $VF_2$ monomer.

The fluoropolymer of the invention has a radius of gyration that is less than the radius of gyration of a similar composition linear fluoropolymer of the same weight average molecular weight.

Additionally, the fluoropolymer of the invention exhibits strain hardening. The term "strain hardening" as used herein, refers to the ability of the material to resist uniaxial or biaxial stretching beyond a certain strain value, showing that the polymer contains branches.

Because of enhanced rheological properties of the flouropolymers of the invention, they could find application in areas where melt rheological properties are required such as blown films, fiber spinning, extrusion blow molding, thermoforming and rigid foams.

The fluoropolymer of the invention has a power-law index "n", in the range of 0.25 to 0.5.

The fluoropolymer of the invention displays a maximum DDR of between 5 and 80. DDR is defined as the ratio between the stretching speed and the extrusion speed.

EXAMPLES

General: De-ionized water was used. SURFLON 111 was supplied from Asahi.

LUPEROX DTA is di t-amyl peroxide (CAS #10508-09-5),

LUPEROX 230 is n-butyl 4,4 bis(t-butyl peroxy) valerate (CAS #995-33-5)

The Comparative Examples 1, 2, and 3 are commercial grades of KYNAR polymer produced by Arkema and were produced by standard emulsion polymerization using a fluorinated surfactant and isopropyl peroxydicarbonate as the initiator (as taught in U.S. Pat. Nos. 3,2475,396; 4,569,978 and 6,187,885 and later refined in U.S. Pat. Nos. 3,857,827, 4,076,929, 4,360,652, 4,569,978, 6,187,885.) incorporated herein by reference. They are linear polymers matched by composition and molecular weight to the branched flouropolymers of the Examples below.

Example 1

Vinylidene fluoride homopolymer made using SURFLON 111 (from Asahi) with potassium persulfate and LUPEROX 230 as initiators. To a 2 gallon stainless steel reactor was added 4300 g of water, 75 g of a 15 wt % aqueous SURFLON 111 surfactant solution, 5.5 g of ethyl acetate, 1.68 g of LUPEROX 230. The mixture was purged with argon and agitated for 10 minutes. The reactor was sealed, agitation was continued, and the reactor was heated to 135 degrees Celsius. The reactor was charged with vinylidene fluoride to reach a pressure of 4600 kPa. A 1.6 wt % solution of potassium persulfate was then fed continuously at a rate between 2 and 120 g/h then reduced to 60 g/h after 30 minutes. The reaction temperature was held at 125 degrees Celsius, and the reaction pressure was maintained by adding as needed vinylidene fluoride. After 2.5 hours, the feed of vinylidene fluoride was stopped. For a period of 10 minutes, agitation was continued, initiator fed and the temperature was maintained. The initiator feed was then stopped, and after 15 minutes the agitation and heating were discontinued. After cooling to room temperature, surplus gas was vented, and the reactor was emptied of latex through a stainless steel mesh. Gravimetric solids measurements of the latex showed the solid polymer to be 22 wt %.

Example 2

Example 2 is similar to example 1 except that the amount of LUPEROX 230 co-initiator was varied. To a 2 gallon stainless steel reactor was added 4300 g of water, 75 g of a 15 wt % aqueous SURFLON 111 surfactant solution, 5.5 g of ethyl acetate, 1.40 g of LUPEROX 230. The mixture was purged with argon and agitated for 10 minutes. The reactor was sealed, agitation was continued, and the reactor was heated to 135 degrees Celsius. The reactor was charged with vinylidene fluoride to reach a pressure of 4600 kPa. A 1.6 wt % solution of potassium persulfate was then fed continuously at a rate between 2 and 120 g/h then reduced to 60 g/h after 30 minutes. The reaction temperature was held at 125 degrees Celsius, and the reaction pressure was maintained by adding as needed vinylidene fluoride. After 2.5 hours, the feed of vinylidene fluoride was stopped. For a period of 10 minutes, agitation was continued, initiator fed and the temperature was maintained. The initiator feed was then stopped, and after 15 minutes the agitation and heating were discontinued. After cooling to room temperature, surplus gas was vented, and the reactor was emptied of latex through a stainless steel mesh. Gravimetric solids measurements of the latex showed the solid polymer to be 22 wt %.

Example 3

Example 3 is similar to Example 1 except that no LUPEROX 230 was used. To a 2 gallon stainless steel reactor was added 4300 g of water, 75 g of a 15 wt % aqueous SURFLON 111 surfactant solution. The mixture was purged with argon and agitated for 10 minutes then 5.5 g of ethyl acetate were added. The reactor was sealed, agitation was continued, and the reactor was heated to 135 degrees Celsius. The reactor was charged with vinylidene fluoride to reach a pressure of 4600 kPa. A 1.6 wt % solution of potassium persulfate was then fed continuously at a rate between 2 and 120 g/h then reduced to 60 g/h after 30 minutes. The reaction temperature was held at 125 degrees Celsius, and the reaction pressure was maintained by adding as needed vinylidene fluoride. After 2.5 hours, the feed of vinylidene fluoride was stopped. For a period of 10 minutes, agitation was continued, initiator fed and the temperature was maintained. The initiator feed was then stopped, and after 15 minutes the agitation and heating were discontinued. After cooling to room temperature, surplus gas was vented, and the reactor was emptied of latex through a stainless steel mesh. Gravimetric solids measurements of the latex showed the solid polymer to be 20.5 wt %.

Example 4

Example 4 is similar to example 1 except HFP was used as the comonomer To a 2 liter, stainless steel reactor was added 600 g of water, 250 g of a 1 wt % aqueous SURFLON 111 surfactant solution, 0.5 g of ethyl acetate, 0.30 g of LUPEROX 230. The mixture was purged with argon and agitated for 10 minutes. The reactor was sealed, agitation was continued, and the reactor was heated to 125 degrees Celsius. The reactor was charged with vinylidene fluoride and hexafluoropropene in a ratio 7/1 to reach a pressure of 640 psi. A 0.5 wt % solution of potassium persulfate was then fed continuously at a rate between 2 and 5 mL/min. The reaction temperature was held at 125 degrees Celsius, and the reaction pressure was maintained by adding as needed vinylidene fluoride and hexafluoropropene in a ratio 7/1. After 2.5 hours, the feed of vinylidene fluoride and hexafluoropropene was stopped. For a period of 10 minutes, agitation was continued, initiator fed and the temperature was maintained. The initiator feed was then stopped, and after 15 minutes the agitation and heating were discontinued. After cooling to room temperature, surplus gas was vented, and the reactor was emptied of latex through a stainless steel mesh. Gravimetric solids measurements of the latex showed the solid polymer to be 21 wt %.

Example 5

Example 5 is similar to Example 1 except that LUPEROX DTA was used as the co-initiator. To a 2 liter, stainless steel reactor was added 645 g of water, 200 g of a 1 wt % aqueous SURFLON 111 surfactant solution, 2 g of ethyl acetate, 0.38 g of LUPEROX DTA. The mixture was purged with argon and agitated for 10 minutes. The reactor was sealed, agitation was continued, and the reactor was heated to 135 degrees Celsius. The reactor was charged with vinylidene fluoride to reach a pressure of 4600 kPa. A 0.5 wt % solution of potassium persulfate was then fed continuously at a rate between 2 and 5 mL/min. The reaction temperature was held at 135 degrees Celsius, and the reaction pressure was maintained by adding as needed vinylidene fluoride. After 2.5 hours, the feed of vinylidene fluoride was stopped. For a period of 10 minutes, agitation was continued, initiator fed and the temperature was maintained. The initiator feed was then stopped, and after 15 minutes the agitation and heating were discontinued. After cooling to room temperature, surplus gas was vented, and the reactor was emptied of latex through a stainless steel mesh. Gravimetric solids measurements of the latex showed the solid polymer to be 21 wt %.

TABLE 1

The table below shows the molecular weight numbers of the examples cited herein. Test method is standard classical size exclusion chromatography (SEC) in combination with Multi-angle light scattering (MALS). Also reported is the melting point and heat of fusion as measured by standard DSC technique during the second heating.

| Properties | Comparative example 1 | Example 1 | Comparative example 2 | Example 2 | Comparative example 3 | Example 3 |
|---|---|---|---|---|---|---|
| Mw (kg/mol) | 263 | 300 | 290 | 350 | 424 | 588 |
| Mw/Mn | 1.9 | 2.7 | 2.0 | 2.5 | 2.3 | 3.5 |
| Mz (kg/mol) | 212 | 899 | 246 | 715 | 467 | 2,230 |
| Tm (° C.) | 167.0 | 163.1 | 169.4 | 162.9 | 168.8 | 162.5 |
| ΔH(J/g) | 56.1 | 50.3 | 55.8 | 53.3 | 55.8 | 49.9 |

FIG. 1 shows the complex viscosity versus frequency as measured by an oscillatory strain rheometer at 230° C. Examples 1, 2 and 3 show a rotation of the viscosity curves with respect to the comparative examples. Such rotation is characterized by a higher low frequency viscosity and a lower viscosity at high frequencies. This phenomenon is referred to as shear thinning. It is indicative of a change in the architecture of the polymer from linear to branched. As one can see the branched polymers display a lower onset of shear thinning.

Figure 2:
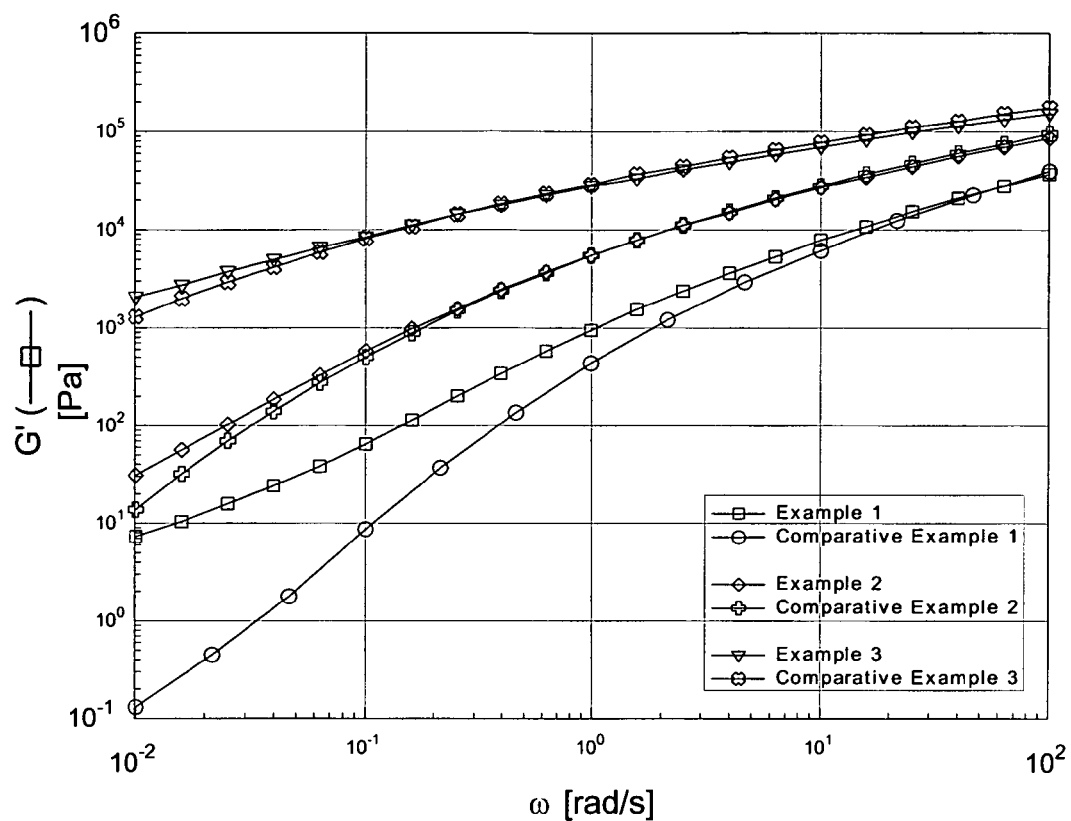
FIG. 2: Shows the storage modulus versus frequency as measured by an oscillatory strain rheometer at 230° C., for the branched polymers of the invention and comparative linear polymers.

FIG. 2 shows the storage modulus versus frequency as measured by an oscillatory strain rheometer at 230° C. Examples 1, 2 and 3 show enhanced storage modulus at low frequencies indicating a high elasticity due to the presence of chain branching.

Figure 3:
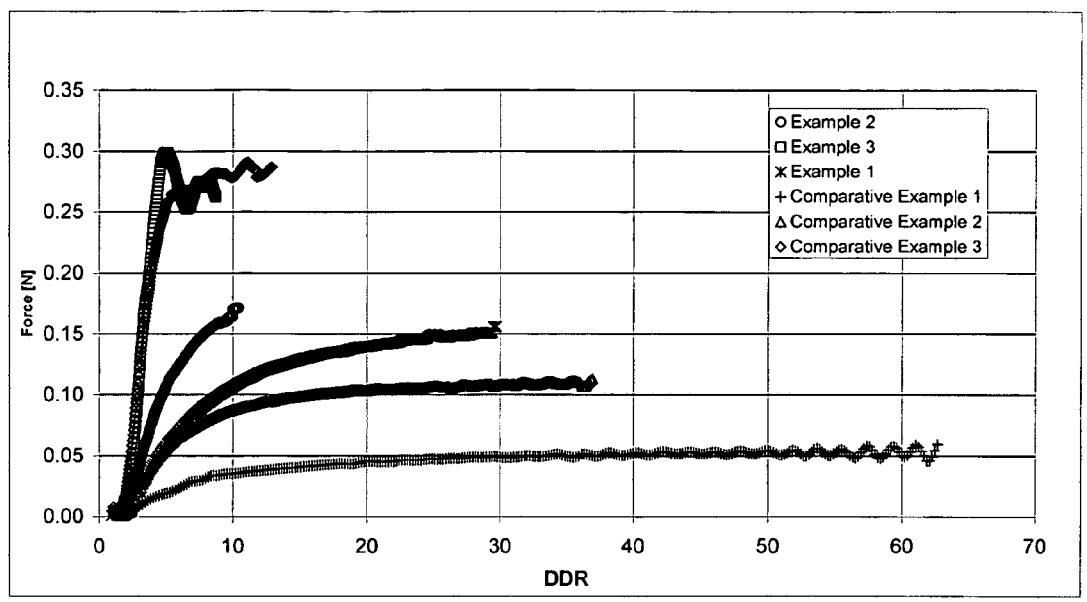
FIG. 3: Shows the melt strength as a function of draw down ratio as measured by a filament stretcher apparatus in combination with a capillary rheometer at 180° C., for the branched polymers of the invention and comparative linear polymers.

FIG. 3 shows the melt strength as a function of draw down ratio as measured by a filament stretcher apparatus in combination with a capillary rheometer. The filament is extruded at 180° C. through a die orifice and subsequently stretched at a constant acceleration rate. Branched samples show a higher melt strength and a lower draw down ratio for the equivalent molecular weights or viscosity.

TABLE 2

Table 2 shows the values of the maximum drawing force and draw down ratio.

| Samples | Max Melt strength (mN) | Max DDR |
|---|---|---|
| Comparative example 1 | 50 | 62 |
| Example 1 | 150 | 30 |
| Comparative example 2 | 115 | 37 |
| Example 2 | 165 | 10 |
| Comparative example 3 | 300 | 5 |
| Example 3 | 280 | 13 |

Figure 4:
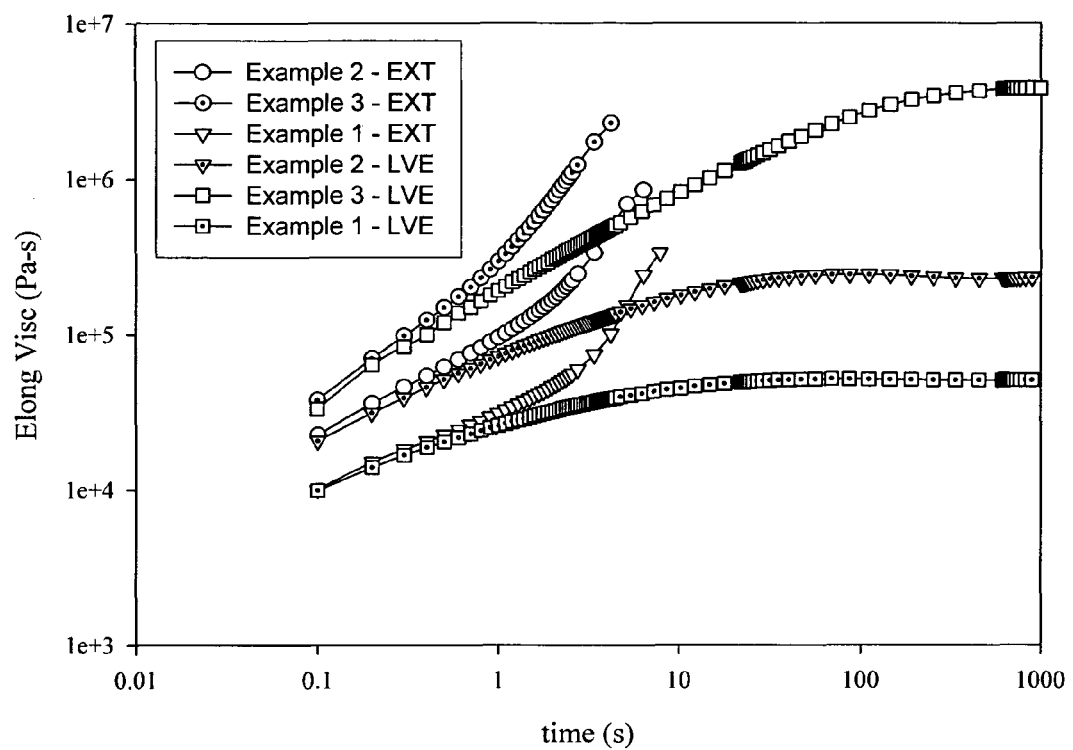
FIG. 4: Shows the extensional viscosity versus time as measured by an extensional rheometer at 180° C., for the branched polymers of the invention and comparative linear polymers.

FIG. 4 shows the extensional viscosity versus time as measured by an extensional rheometer at 180° C. LVE measurements were measured by an oscillatory strain rheometer to determine the zero-shear viscosity, which was converted to zero-extension viscosity using the Trouton law. Extensional viscosity measurements were determined by an extensional rheometer at an extension rate of 5 sec$^{-1}$. It is well established in the art that linear polymers, such as KYNAR Comparative examples 1, 2, and 3, show no changes in zero-extension viscosity transient. The branched polymers of this invention display a change in zero-extension viscosity tramsient indicative of strain hardening behavior.

Figure 5:
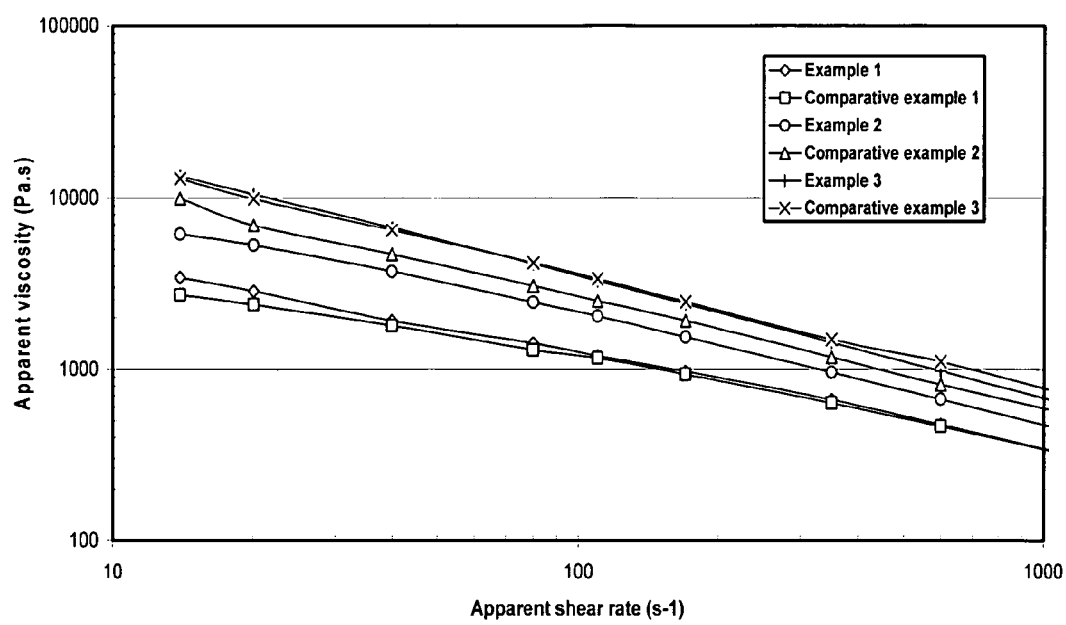
FIG. 5: Shows the apparent viscosity as a function of apparent shear rate as measured by a capillary rheometer under standard conditions and using a orifice die of 30/1 ratio, for the branched polymers of the invention and comparative linear polymers.

FIG. 5 shows the apparent viscosity as a function of apparent shear rate as measured by a capillary rheometer under standard conditions and using a orifice die of 30/1 ratio.

TABLE 3

Table 3 shows the melt viscosity at 180° C. and 110 sec-1. Swell ratio was measured in dynamic mode using a laser beam. The higher swell ratio of the branched PVDF is indicative of higher elasticity, which is a result of the presence of branches.

| Samples | Melt viscosity (kpoise) | Swell ratio |
|---|---|---|
| Comparative example 1 | 11.7 | 1.14 |
| Example 1 | 12.0 | 2.39 |
| Comparative example 2 | 25.0 | 1.54 |
| Example 2 | 20.4 | 1.92 |
| Comparative example 3 | 33.6 | 1.67 |
| Example 3 | 32.9 | 1.87 |

What is claimed is:

1. A process for forming a branched fluoropolymer comprising:
    a) combining
        1) at least 70 percent by weight of vinylidene fluoride with optionally one or more monomers are selected from the group consisting of vinylidene fluoride, vinyl fluoride, trifluoroethene, tetrafluoroethene, 3,3,3-trifluoro-1-propene, 1,2,3,3,3-pentafluoropropene, 3,3,3,4,4-pentafluoro-1-butene, hexafluoropropene, hexafluoroisobutylene, perfluorinated vinyl ethers, perfluoromethyl vinyl ether, perfluoroethyl vinyl ether, perfluoro-n-propyl vinyl ether, perfluoro-2-propoxypropyl vinyl ether, fluorinated dioxoles, perfluoro(1,3-dioxole), perfluoro(2,2-dimethyl-1,3-dioxole), 2-hydroxyethyl allyl ether, and 3-allyloxypropanediol;
        2) a persulfate initiator,
        3) a diperoxide co-initiator, and
        4) a liquid carrier to form a reaction mixture;
    b) heating the reaction mixture, with agitation, to a temperature of from 120° C. to 150° C.; and
    c) adding a constant feed of persulfate initiator to the reaction mixture continuously over the life of the polymerization after the reaction temperature is reached and continuing the persulfate initiator feed until after the monomer feed is stopped, wherein the use of said persulfate initiator at said high polymerization produces fluoropolymer having long chain branching, and less than 5 percent by weight of gels,
    wherein the process does not make use of fluorinated diolefins to induce branching, wherein said long chain branching occurs due to the action of the persulfate initiator on the forming fluoropolymer chain at the high temperature of from 120° C. to 150° C.

2. The process of claim 1 wherein said persulfate initiator is selected from the group consisting of potassium persulfate, sodium persulfate, and ammonium persulfate.

3. The process of claim 1 wherein said liquid carrier is water or supercritical carbon dioxide.

4. The process of claim 1 wherein said reaction mixture further comprises one or more additives selected from the group consisting of surfactants, emulsifiers, cosurfactants, chain transfer agents, buffering agents, and antifoulants.

* * * * *